United States Patent
Lee et al.

(10) Patent No.: US 9,906,935 B2
(45) Date of Patent: Feb. 27, 2018

(54) BLUETOOTH LOW ENERGY BEACON DEVICE AND ADVERTISING METHOD

(71) Applicant: ISSC Technologies Corp., Hsinchu (TW)

(72) Inventors: Chung-I Lee, Hsinchu County (TW); Hsin-Ling Chu, Hsinchu County (TW); Li-Wei Chang, Hsinchu (TW)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 101 days.

(21) Appl. No.: 14/564,089

(22) Filed: Dec. 9, 2014

(65) Prior Publication Data

US 2016/0095047 A1 Mar. 31, 2016

(30) Foreign Application Priority Data

Sep. 30, 2014 (TW) .............................. 103133953 A (51) Int. Cl.
H04W 48/10 (2009.01)
H04W 8/00 (2009.01)
H04W 4/00 (2018.01)

(52) U.S. Cl.
CPC ........... *H04W 8/005* (2013.01); *H04W 4/008* (2013.01)

(58) Field of Classification Search
None
See application file for complete search history.

(56) References Cited

U.S. PATENT DOCUMENTS

| 2009/0232041 A1 | 9/2009 | Smith ........................... 370/312 |
| 2010/0056054 A1* | 3/2010 | Yamato ................. H04W 52/50 455/41.2 |
| 2010/0202423 A1 | 8/2010 | Karaoguz et al. ............ 370/338 |
| 2012/0119902 A1* | 5/2012 | Patro ....................... H04L 12/12 340/502 |
| 2012/0258669 A1 | 10/2012 | Honkanen et al. ........ 455/67.11 |

(Continued)

FOREIGN PATENT DOCUMENTS

| CN | 101895822 A | 11/2010 |
| CN | 102882637 A | 1/2013 |
| WO | 02/01813 A2 | 1/2002 |

OTHER PUBLICATIONS

Provisional app. 62038368, "Method and System for Enabling Micro-proximity Dectection Check-in, and information Access to Improve Customer Engagement and Advertising Accuracy", filed on Aug. 18, 2014.*

(Continued)

*Primary Examiner* — Christopher Crutchfield
*Assistant Examiner* — Thinh Tran
(74) *Attorney, Agent, or Firm* — Slayden Grubert Beard PLLC (57) ABSTRACT

A Bluetooth low energy (BLE) beacon device and a BLE advertising method are provided. The BLE advertising method includes: enabling a broadcast action with different advertising packets simultaneously, wherein the advertising packets include connectable and unconnectable advertising packets; setting advertising time information of the advertising packets; setting advertising data and an advertising packet address code; and executing the broadcast action for the advertising packets in sequence according to the advertising time information and the type of each of the advertising packets.

22 Claims, 6 Drawing Sheets

(56) References Cited

U.S. PATENT DOCUMENTS

| | | | |
|---|---|---|---|
| 2013/0065584 A1 | 3/2013 | Lyon et al. | 455/434 |
| 2015/0133054 A1* | 5/2015 | Chen | H04W 74/002 455/41.2 |
| 2015/0172902 A1* | 6/2015 | Kasslin | H04L 45/745 370/328 |
| 2015/0382304 A1* | 12/2015 | Park | H04W 52/0248 455/41.2 |
| 2016/0050530 A1* | 2/2016 | Corbalis | G06Q 20/3278 455/456.1 |

OTHER PUBLICATIONS

Taiwan Office Action, Application No. 103133953, 5 pages, dated Jan. 11, 2016.

\* cited by examiner

BLUETOOTH LOW ENERGY BEACON DEVICE AND ADVERTISING METHOD

CROSS-REFERENCE TO RELATED APPLICATION

This application claims the priority benefit of Taiwan application serial no. 103133953, filed on Sep. 30, 2014. The entirety of the above-mentioned patent application is hereby incorporated by reference herein and made a part of this specification.

BACKGROUND OF THE INVENTION

Field of the Invention

The invention relates to a Bluetooth low energy (BLE) beacon device and a BLE advertising method, and more particularly relates to a BLE beacon device and a BLE advertising method capable of multicasting.

Description of Related Art

According to the conventional technology, the information sent by Bluetooth low energy (BLE) mainly includes a universally unique identifier (UUID) and other information. When a Bluetooth receiving device (e.g., a smart phone) receives the universally unique identifier sent by a BLE beacon device, the smart phone may perform subsequent actions, such as downloading commercial advertising messages or user information from the Internet, according to the universally unique identifier. However, on the premise that connection with an unconnectable advertising packet is not possible, only one-way message transmission from the BLE beacon device to the smart phone is allowed in actual application. Thus, applicability of the BLE beacon device is limited.

In addition, according to the current BLE specification, the conventional Bluetooth beacon device can only send advertising packets of the same type continuously in a time interval. To change the advertised content, the Bluetooth beacon device needs to stop the broadcast action for updating the advertising data content and then start the broadcast action of the new advertising packet, which is inconvenient for the user.

SUMMARY OF THE INVENTION

The invention provides a Bluetooth low energy (BLE) beacon device and a BLE advertising method for executing a broadcast action for different types of advertising packets.

The BLE advertising method of the BLE beacon device of the invention includes: enabling a broadcast action of a plurality of advertising packets that are different from each other, wherein the advertising packets include connectable advertising packets and unconnectable advertising packets; setting advertising time information of the advertising packets; setting advertising data and an advertising packet address code of each of the advertising packets; and executing the broadcast action for each of advertising packets in sequence according to the advertising time information and an advertising type of each of the advertising packets.

In an embodiment of the invention, the step of setting the advertising time information of the advertising packets includes setting an advertising time interval of each of the advertising packets according to the number of the advertising packets.

In an embodiment of the invention, the step of setting the advertising time interval of each of the advertising packets according to the number of the advertising packets includes: calculating a bandwidth requirement of the advertising packets according to the number of the advertising packets, and setting the advertising time interval of each of the advertising packets according to the bandwidth requirement.

In an embodiment of the invention, a plurality of the unconnectable advertising packets are enabled in the same time.

In an embodiment of the invention, a plurality of the unconnectable advertising packets and one of the connectable advertising packets are enabled in the same time.

In an embodiment of the invention, the step of setting the advertising packet address code of each of the advertising packets includes: generating a plurality of random address codes based on a public address code of a Bluetooth device, wherein the random address codes are respectively assigned to the unconnectable advertising packets.

The BLE beacon device of the invention includes a BLE controller. The BLE controller calls a plurality of customized commands in a host control interface layer for respective execution; enabling a broadcast action of a plurality of advertising packets that are different from each other, wherein each of the advertising packets is a connectable advertising packet or an unconnectable advertising packet; setting advertising time information of the advertising packets; setting advertising data and an advertising packet address code of each of the advertising packets; and executing the broadcast action for each of advertising packets in sequence according to the advertising time information and the advertising type of each of the advertising packets.

Based on the above, the invention enables the BLE controller to perform settings of the multiple packet broadcast action through customized commands. Through the set content, the BLE beacon device is capable of performing the packet broadcast action for multiple different advertising packets. Accordingly, the BLE beacon device is not required to repeatedly switch advertising parameter settings of the controller when switching between the broadcast actions for different advertising packets. Thus, the overall efficiency of the system is improved.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
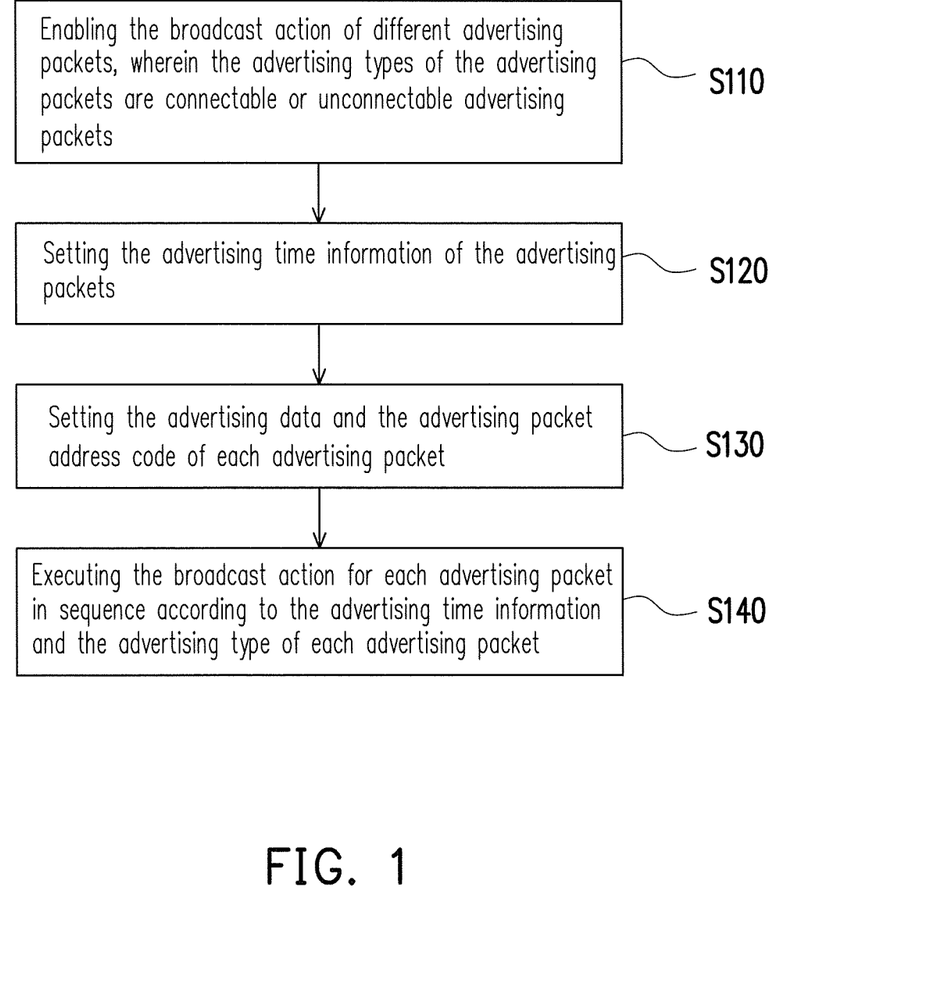
FIG. 1 is a flowchart showing a Bluetooth low energy (BLE) advertising method according to an embodiment of the invention.
Figure 2:
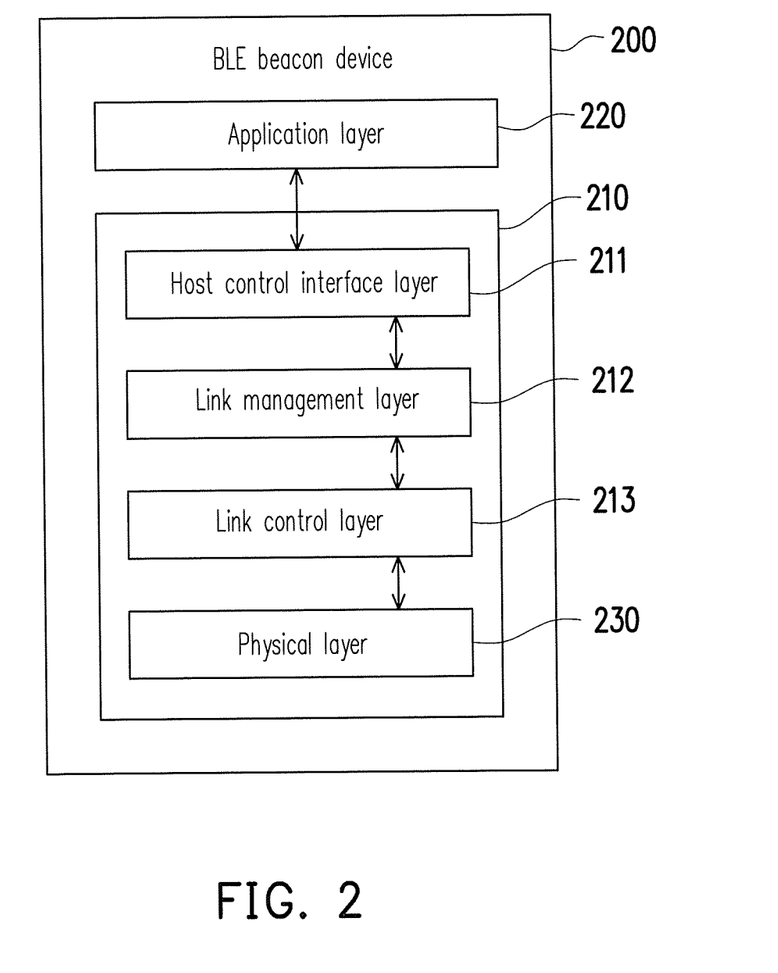
FIG. 2 is a schematic diagram showing a BLE beacon device according to an embodiment of the invention.

With reference to FIG. 1 and FIG. 2, FIG. 1 is a flowchart showing a Bluetooth low energy (BLE) advertising method according to an embodiment of the invention, and FIG. 2 is a schematic diagram showing a BLE beacon device according to an embodiment of the invention. In FIG. 2, a BLE beacon device 200 includes a BLE controller 210, an application layer 220, and a Bluetooth physical layer 230. The BLE controller 210 includes a host control interface layer 211 and a link management layer 212. The BLE controller 210 further includes a link control layer 213 that is coupled to the host control interface layer 211 through the link management layer 212.

Regarding steps of the advertising method, Step S110 enables a broadcast action of a plurality of advertising packets that are different from each other. Regarding advertising types of the enabled advertising packets, the advertising packets may be connectable advertising packets or unconnectable advertising packets. It should be noted that a demand for enabling the broadcast action of the advertising packets may come from one or a plurality of applications in the application layer 220. That is, when the user intends to execute the broadcast action of the advertising packets, the demand is generated through the application in the application layer 220, and then the application transmits the demand to the host control interface layer 211. Here, the host control interface layer 211 provides a plurality of customized commands. The BLE controller 210 calls the customized commands in the host control interface layer 211 through the host control interface layer 211, so as to execute actions in the subsequent steps.

In Step S120, the BLE controller 210 further sets advertising time information of the advertising packets. Regarding the advertising time information, the BLE controller 210 sets an advertising time interval for advertising each of the advertising packets. It should be noted that the advertising time interval for advertising each advertising packet is calculated based on the number of the advertising packets. Since a total bandwidth of the advertising is fixed, when there are more advertising packets, the advertising time interval the BLE controller 210 sets for each advertising packet may be longer. On the other hand, when there are fewer advertising packets, the advertising time interval the BLE controller 210 sets for each advertising packet may be shorter.

In addition, the BLE controller 210 may set the time interval according to a bandwidth requirement of each advertising packet. For example, if the advertising packet has a higher bandwidth requirement, the BLE controller 210 sets a shorter advertising time interval for the corresponding advertising packet.

In Step S130, the BLE controller 210 sets advertising data and an advertising packet address code of each advertising packet. It should be noted that, according to the Bluetooth protocol specification, every Bluetooth device has a unique public address code; however, the Bluetooth protocol specification does not impose any restriction on a random address code. Therefore, in this embodiment, in order to achieve the broadcast action for multiple advertising packets, the BLE controller 210 sets the public address code to correspond to the connectable advertising packet and sets the random address code to correspond to the unconnectable advertising packet. To enhance the management of the BLE beacon device 200, all the random address codes are generated based on the public address code. Accordingly, the manager of the BLE beacon device 200 can derive the public address code from the random address code corresponding to the advertising packet through calculation according to a formula, and thereby determine which BLE beacon device 200 sends the advertising packet.

It is worth mentioning that the BLE beacon device 200 can send only one connectable advertising packet in one time interval, but the BLE beacon device 200 can send multiple unconnectable advertising packets in one time interval.

In Step S140, the BLE controller 210 executes the broadcast action for each advertising packet in sequence according to the advertising time information set in the previous step and the advertising type of each advertising packet.

It should be noted that the invention is not intended to limit the sequence of executing Step S120 and Step S130. In an embodiment of the invention, the BLE controller 210 may execute the action of Step S120 first and then execute the action of Step S130, or the BLE controller 210 may simultaneously execute the actions of Step S120 and Step S130. Alternatively, the BLE controller 210 may execute the action of Step S130 first and then execute the action of Step S120.

Figure 3:
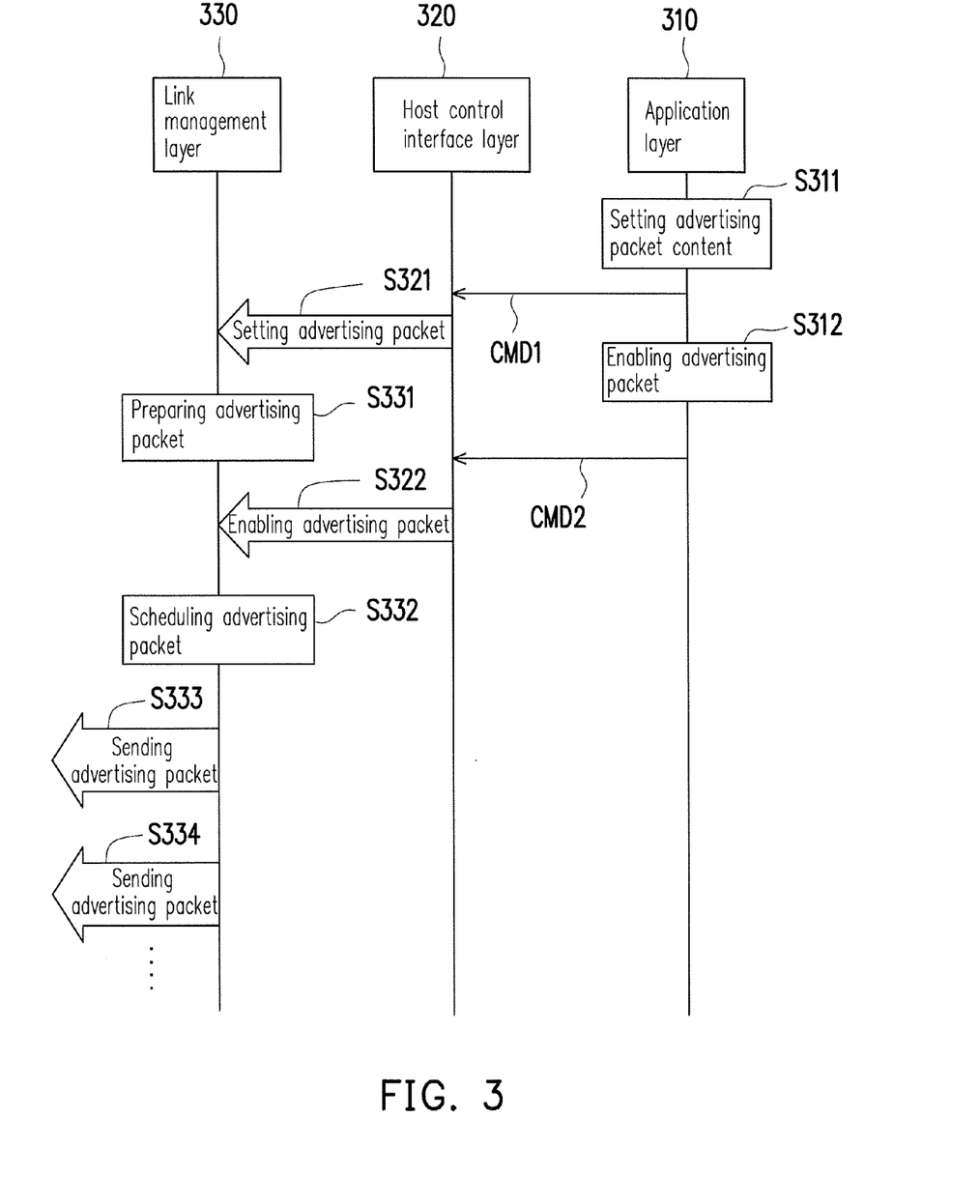
FIG. 3 is a flowchart showing the BLE advertising method according to another embodiment of the invention.

To more clearly explain the actions and steps of the BLE advertising method of the embodiment of the invention, below FIG. 3 is a flowchart showing the BLE advertising method according to another embodiment of the invention. Through an application in an application layer 310, the action of setting advertising packet content in Step S311 can be performed, and correspondingly a customized command CMD1 is provided to a host control interface layer 320 for setting relevant information, such as the advertising time interval, advertising data, and advertising packet address code, of the advertising packet. Moreover, through the application in the application layer 310, the action of enabling the advertising packet in Step S312 can be performed, and a customized command CMD2 is provided to the host control interface layer 320 for enabling the broadcast action of the advertising packet.

The host control interface layer 320 performs Step S321 to set the advertising packet according to the customized command CMD1 and performs Step S322 to perform enabling of the advertising packet according to the customized command CMD2.

Further, corresponding to Step S321, the link management layer 330 executes a preparation action of the advertising packet in Step S331, and corresponding to Step S322, the link management layer 330 executes a scheduling action of the advertising packet in Step S332. After completing Step S331 and Step S332, the link management layer 330 performs a sending action for the advertising packets by time-sharing (Step S333 and Step S334).

It is worth mentioning that, in this embodiment, the customized command provided by the host control interface layer 320 includes: a behavior parameter for setting the BLE beacon device, e.g., advertising time interval of parameters of the BLE beacon device, what advertising packet address codes are used for advertising, and so on; and content for setting advertising data of the BLE beacon device; and an ON or OFF action for controlling whether to enable the BLE beacon device.

Figure 4A:
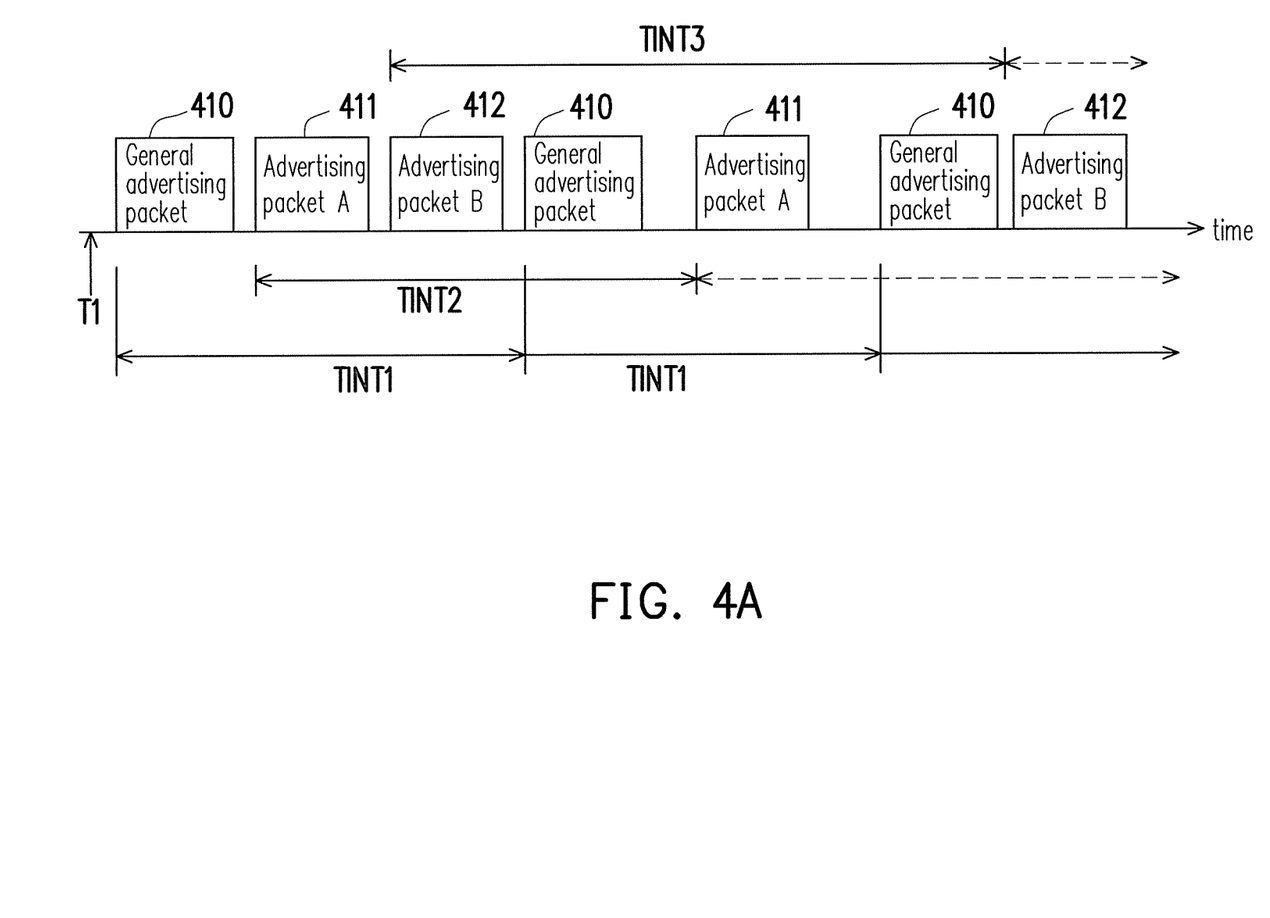
FIG. 4A to FIG. 4B are timing diagrams respectively showing advertising methods according to the embodiments of the invention.
Figure 4B:
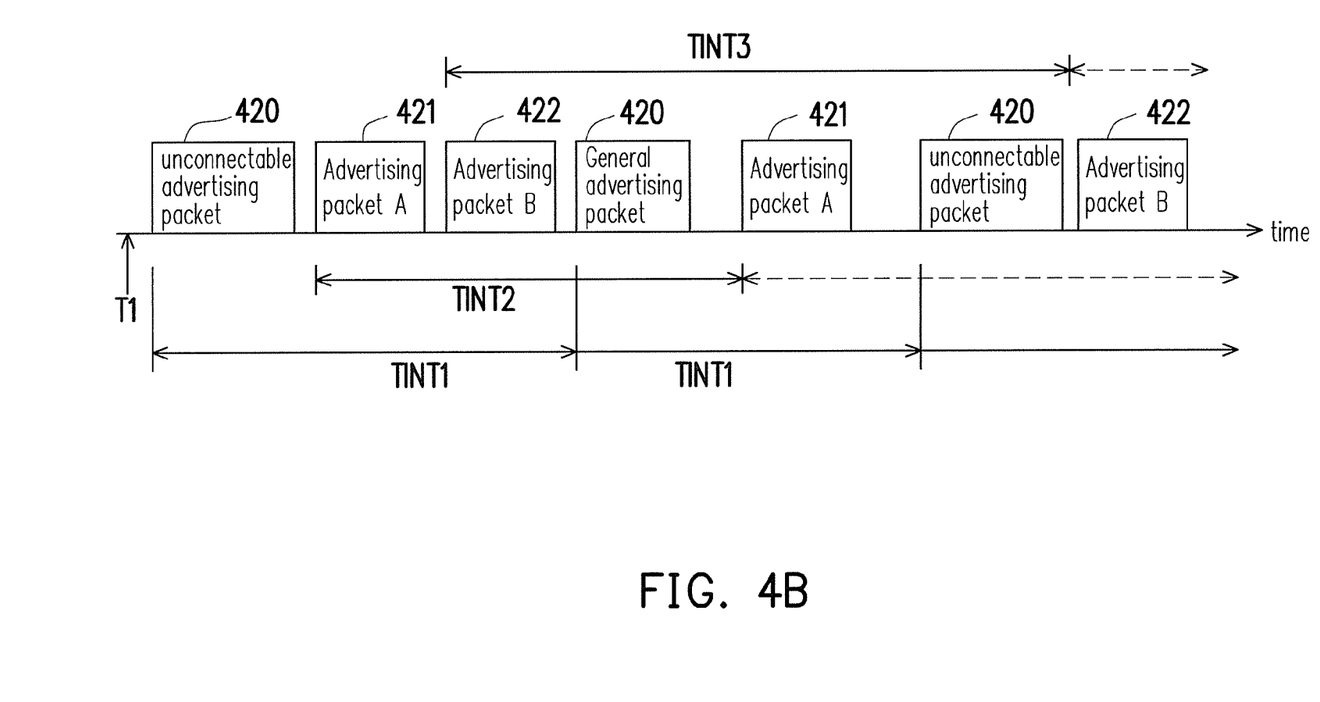

Below FIG. 4A to FIG. 4B are timing diagrams respectively showing various advertising methods according to the embodiments of the invention. In FIG. 4A, at a time point T1, the BLE beacon device sets parameters and data for a broadcast action of a general advertising packet 410 and sets parameters and data for a broadcast action of a plurality of multicasting advertising packets (advertising packet A 411 and advertising packet B 412), and enables the broadcast actions for the general advertising packet 410 and the multicasting advertising packets (the advertising packet A 411 and the advertising packet B 412). Then, the broadcast action for the general advertising packet 410 is performed in sequence according to a set advertising time interval TINT1. Further, the broadcast actions for the advertising packet A 411 and the advertising packet B 412 are respectively performed in sequence according to set advertising time intervals TINT2 and TINT3.

The setting of the parameters and data of the multicasting includes setting the advertising time information (advertising time interval), the advertising data, and the advertising packet address code. Details thereof have been specified in the previous embodiment and thus are not repeated hereinafter. Moreover, the general advertising packet 410 may be a connectable advertising packet while the advertising packet A 411 and the advertising packet B 412 are both unconnectable advertising packets.

In FIG. 4B, at the time point T1, the BLE beacon device sets parameters and data for the broadcast action of a general advertising packet of an unconnectable advertising packet 420 and sets parameters and data for the broadcast action of a plurality of multicasting advertising packets (advertising packet A 421 and advertising packet B 422), and enables the broadcast actions for the unconnectable advertising packet 420 and the multicasting advertising packets (the advertising packet A 411 and the advertising packet B 412). Then, the broadcast action for the unconnectable advertising packet 420 is performed in sequence according to the set advertising time interval TINT1. Further, the broadcast actions for the advertising packet A 421 and the advertising packet B 422 are respectively performed in sequence according to the set advertising time intervals TINT2 and TINT3. The advertising packet A 421 and the advertising packet B 422 are both unconnectable advertising packets.

Figure 5:
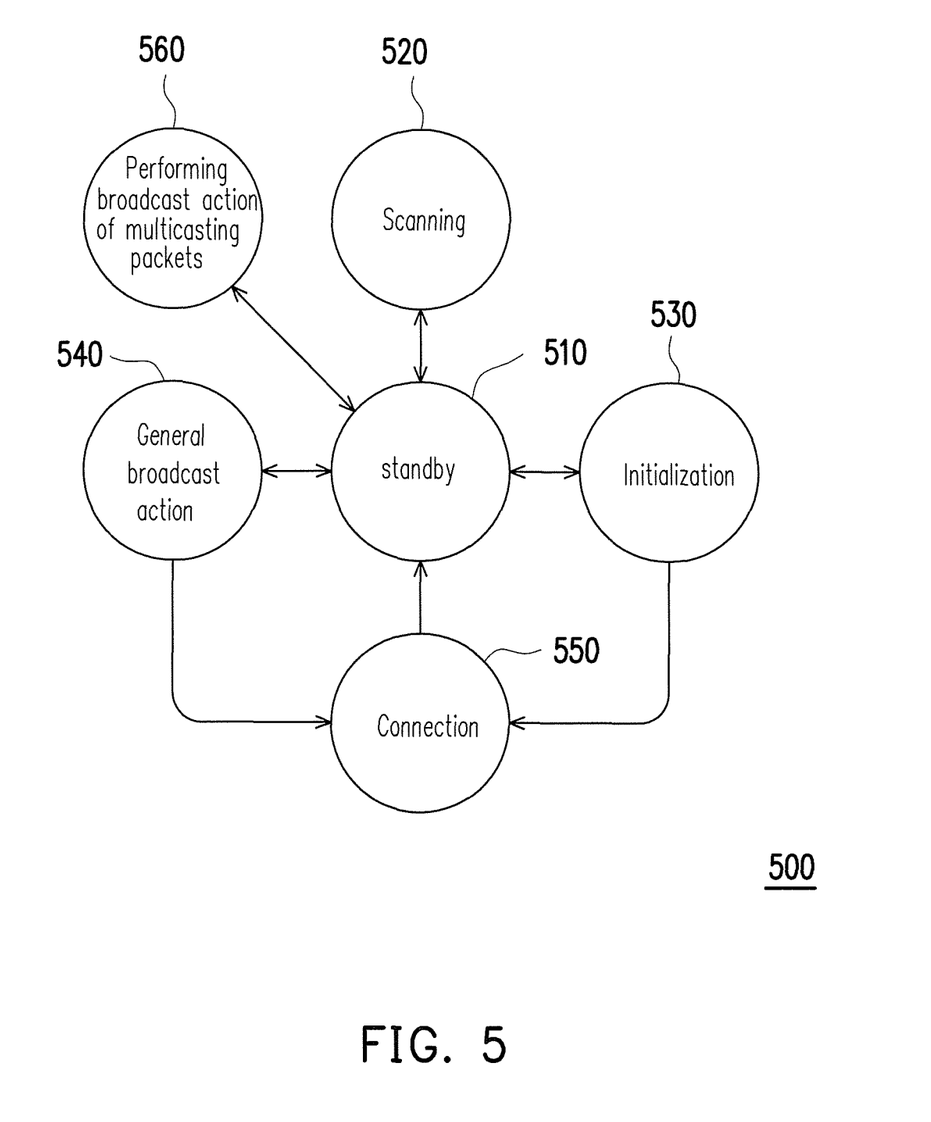
FIG. 5 is a schematic diagram showing states of the BLE advertising method according to an embodiment of the invention.

With reference to FIG. 5, FIG. 5 is a schematic diagram showing states of the BLE advertising method according to an embodiment of the invention. In State 510, the BLE beacon device is in a standby state. The BLE beacon device may enter State 530, i.e., an initialization state, from the standby state and enter State 550 for establishing connection when a connection demand is received, or the BLE beacon device may return to the standby state 510 from the initialization state 530 if no connection demand is received.

Moreover, in the standby state 510, the BLE beacon device may enter State 520 to perform a scanning action for scanning Bluetooth receiving devices in a Bluetooth range of the BLE beacon device and return to the standby state 510 after completing the scanning action.

The BLE beacon device may switch from the standby state 510 to State 560 for performing the broadcast action of multicasting advertising packets and return to the standby state 510 after completing the broadcast action of the multicasting advertising packets.

Further, the BLE beacon device may switch from the standby state 510 to State 540 for the general broadcast action and return to the standby state 510 after completing the general broadcast action. In State 540 of the general broadcast action, if the advertising packet is a connectable advertising packet and has a demand for establishing connection, the BLE beacon device may enter a connection state 550 and return to the standby state 510 after completing the connection.

To conclude the above, the invention provides a plurality of customized commands, and through calling the customized commands in the host control interface layer, enables the BLE device to perform the broadcast action of multiple different advertising packets. Accordingly, different advertising packets can be advertised in sequence in the same time interval without repeatedly stopping the broadcast action to change the data of the advertising packets. Thus, the efficiency of the BLE broadcast action is improved.

What is claimed is:

1. A Bluetooth low energy (BLE) advertising method, comprising: enabling a broadcast action of a plurality of advertising packets that are different from each other within a BLE beacon device, wherein the plurality of advertising packets comprise a connectable advertising packet and an unconnectable advertising packet;
setting advertising time information of the plurality of advertising packets by the BLE beacon device according to the number of the plurality of advertising packets by:
calculating a bandwidth requirement of the plurality of advertising packets according to the number of the plurality of advertising packets; and
setting the advertising time interval of each of the plurality of advertising packets according to the bandwidth requirement;
setting advertising data and an advertising packet address code of each of the plurality of advertising packets by the BLE beacon device; and
executing the broadcast action for each of the plurality of advertising packets in sequence according to the advertising time information and an advertising type of each of the plurality of advertising packets by the BLE beacon device, wherein the advertising type indicates whether an associated advertising packet is connectable or unconnectable.

2. The BLE advertising method according to claim 1, wherein during an advertising time interval a broadcast action for at least one connectable advertising packet and for at least one unconnectable advertising packet is executed.

3. The BLE advertising method according to claim 1, wherein the step of executing the broadcast action for each of the plurality of advertising packets in sequence according to the advertising time information and the advertising type of each of the plurality of advertising packets comprises:
broadcasting a plurality of unconnectable advertising packets in a same time interval.

4. The BLE advertising method according to claim 1, wherein the step of executing the broadcast action for each of the plurality of advertising packets in sequence according to the advertising time information and the advertising type of each of the plurality of advertising packets comprises:
broadcasting one of a plurality of connectable advertising packets in a same time interval.

5. The BLE advertising method according to claim 1, wherein the step of setting the advertising packet address code of each of the plurality of advertising packets comprises:
generating a plurality of random address codes based on a public address code of a Bluetooth device, wherein the random address codes are respectively assigned to unconnectable advertising packets.

6. A Bluetooth low energy (BLE) beacon device, comprising:
a BLE controller configured to execute a plurality of customized commands in a host control interface layer, wherein the BLE controller is configured:
to enable a broadcast action of a plurality of advertising packets that are different from each other, wherein an advertising type of each of the advertising packets indicates a connectable advertising packet and an unconnectable advertising packet, and the advertising packets comprise a connectable advertising packet and an unconnectable advertising packet;
to set advertising time information of the plurality of advertising packets;
to set advertising data and an advertising packet address code of each of the plurality of advertising packets; and
to execute the broadcast action for each of the plurality of advertising packets in sequence according to the advertising time information and the advertising type of each of the plurality of advertising packets, wherein the BLE controller is further configured to calculate a bandwidth requirement of the plurality of advertising packets according to the number of the advertising packets and sets an advertising time interval of each of the plurality of advertising packets according to the bandwidth requirement.

7. The BLE beacon device according to claim 6, wherein during an advertising time interval a broadcast action for at least one connectable advertising packet and for at least one unconnectable advertising packet is executed.

8. The BLE beacon device according to claim 6, wherein the BLE controller enables a plurality of unconnectable advertising packets in a same time interval.

9. The BLE beacon device according to claim 6, wherein the BLE controller enables one of a plurality of connectable advertising packets in a same time interval.

10. The BLE beacon device according to claim 6, wherein the BLE controller generates a plurality of random address codes based on a public address code of a Bluetooth device and respectively assigns the random address codes to unconnectable advertising packets.

11. The BLE beacon device according to claim 6, wherein the BLE controller comprises: a link management layer coupled with the host control interface layer, wherein the host control interface layer provides the customized commands, and the BLE controller is coupled to an application layer through the host control interface layer.

12. The BLE beacon device according to claim 11, further comprising:
a Bluetooth physical layer coupled to the BLE controller.

13. A Bluetooth low energy (BLE) advertising method, comprising:
enabling a broadcast action of a plurality of advertising packets that are different from each other, wherein the plurality of advertising packets comprise a connectable advertising packet and an unconnectable advertising packet;
setting advertising time information of the plurality of advertising packets, wherein an advertising time interval is set of each of the plurality of advertising packets according to the number of the plurality of advertising packets by:
calculating a bandwidth requirement of the plurality of advertising packets according to the number of the plurality of advertising packets; and
setting the advertising time interval of each of the plurality of advertising packets according to the bandwidth requirement;
setting advertising data and an advertising packet address code of each of the plurality of advertising packets; and
executing the broadcast action for each of the plurality of advertising packets in sequence according to the advertising time information and an advertising type of each of the plurality of advertising packets, wherein the advertising type indicates whether an associated advertising packet is connectable or unconnectable.

14. The BLE advertising method according to claim 13, wherein the step of executing the broadcast action for each of the plurality of advertising packets in sequence according to the advertising time information and the advertising type of each of the plurality of advertising packets comprises:
broadcasting a plurality of unconnectable advertising packets in a same time interval.

15. The BLE advertising method according to claim 13, wherein the step of executing the broadcast action for each of the plurality of advertising packets in sequence according to the advertising time information and the advertising type of each of the plurality of advertising packets comprises:
broadcasting one of a plurality of connectable advertising packets in a same time interval.

16. The BLE advertising method according to claim 13, wherein the step of setting the advertising packet address code of each of the plurality of advertising packets comprises:
generating a plurality of random address codes based on a public address code of a Bluetooth device, wherein the random address codes are respectively assigned to unconnectable advertising packets.

17. A Bluetooth low energy (BLE) beacon device, comprising:
a BLE controller configured to execute a plurality of customized commands in a host control interface layer, wherein the BLE controller is configured:
to enable a broadcast action of a plurality of advertising packets that are different from each other by executing a customized command, wherein an advertising type of each of the advertising packets indicates a connectable advertising packet and an unconnectable advertising packet, and the advertising packets comprise a connectable advertising packet and an unconnectable advertising packet;
to set advertising time information of the plurality of advertising packets;
to set advertising data and an advertising packet address code of each of the plurality of advertising packets; and
to execute the broadcast action for each of the plurality of advertising packets in sequence according to the advertising time information and the advertising type of each of the plurality of advertising packets, and
wherein the BLE controller calculates a bandwidth requirement of the plurality of advertising packets according to the number of the advertising packets and sets an advertising time interval of each of the plurality of advertising packets according to the bandwidth requirement.

18. The BLE beacon device according to claim 17, wherein the BLE controller enables a plurality of unconnectable advertising packets in a same time interval.

19. The BLE beacon device according to claim 17, wherein the BLE controller enables one of a plurality of connectable advertising packets in a same time interval.

20. The BLE beacon device according to claim 17, wherein the BLE controller generates a plurality of random address codes based on a public address code of a Bluetooth device and respectively assigns the random address codes to unconnectable advertising packets.

21. The BLE beacon device according to claim 17, wherein the BLE controller comprises: a link management layer coupled with the host control interface layer, wherein the host control interface layer provides the customized commands, and the BLE controller is coupled to an application layer through the host control interface layer.

22. The BLE beacon device according to claim 21, further comprising:
a Bluetooth physical layer coupled to the BLE controller.

* * * * *